(12) United States Patent
Zhang

(10) Patent No.: US 8,788,983 B2
(45) Date of Patent: Jul. 22, 2014

(54) METHOD FOR CORRECTING LAYOUT PATTERN AND MASK THEREOF

(71) Applicant: Semiconductor Manufacturing International Corp., Shanghai (CN)

(72) Inventor: Jasmine Zhang, Shanghai (CN)

(73) Assignee: Semiconductor Manufacturing International Corp, Shanghai (CN)

( * ) Notice: Subject to any disclaimer, the term of this patent is extended or adjusted under 35 U.S.C. 154(b) by 0 days.

(21) Appl. No.: 13/845,149

(22) Filed: Mar. 18, 2013

(65) Prior Publication Data
US 2013/0275928 A1    Oct. 17, 2013

(30) Foreign Application Priority Data
Apr. 17, 2012 (CN) .......................... 2012 1 0113407

(51) Int. Cl.
G06F 17/50 (2006.01)
(52) U.S. Cl.
USPC .......................................................... 716/53
(58) Field of Classification Search
USPC .......................................................... 716/53
See application file for complete search history.

(56) References Cited

U.S. PATENT DOCUMENTS

| 2002/0001758 A1* | 1/2002 | Petersen et al. | 430/5 |
| 2009/0265680 A1* | 10/2009 | Izuha et al. | 716/21 |
| 2010/0180251 A1* | 7/2010 | Ye et al. | 716/19 |
| 2010/0233598 A1* | 9/2010 | Matsunawa et al. | 430/30 |
| 2012/0054695 A1* | 3/2012 | Izuha et al. | 716/53 |

* cited by examiner

*Primary Examiner* — Thuan Do
*Assistant Examiner* — Mohammed Alam
(74) *Attorney, Agent, or Firm* — Anova Law Group, PLLC

(57) ABSTRACT

A method for correcting layout pattern and a mask having the corrected layout pattern thereon are provided. In an exemplary method, a first layout pattern including a plurality of first hole patterns can be provided to form an auxiliary pattern in each first hole pattern and to obtain a second layout pattern. The auxiliary pattern can have a dimension smaller than an exposure resolution in a photolithography process. The second layout pattern can then be processed by an optical proximity correction (OPC) to obtain a first modified layout pattern. The first modified layout pattern can include a plurality of modified first hole patterns modified by the OPC. The first modified layout pattern can be simulated to obtain an actual layout pattern such that the actual layout pattern and the first layout pattern have an edge placement error (EPE) within a predetermined range.

20 Claims, 7 Drawing Sheets

METHOD FOR CORRECTING LAYOUT PATTERN AND MASK THEREOF

CROSS REFERENCE TO RELATED APPLICATIONS

The present application claims priority to Chinese Patent Application No. CN201210113407.6, filed on Apr. 17, 2012, and entitled "METHOD FOR LAYOUT PATTERN CORRECTION", the entire disclosure of which is incorporated herein by reference.

FIELD OF THE DISCLOSURE

The present disclosure generally relates to the field of semiconductor technology, and in particular to a method for correcting layout pattern and a mask having the corrected layout pattern thereon.

BACKGROUND OF THE DISCLOSURE

In semiconductor device manufacturing, photolithography is one of the most important processes for integrated circuits (ICs). With the developments in semiconductor device manufacturing technology, the feature size continues to shrink, which requires higher resolution in photolithography. Photolithography resolution refers to the minimum feature size (also called the critical dimension, CD) that a photolithography tool can expose onto a wafer, which is an important performance indicator in photolithography technology.

In order to achieve smaller CD, resolution enhancement technologies have been used to expose a finer image on the photoresist and manufacture a semiconductor device near the photolithography resolution limits in mask making. The resolution enhancement technologies include the use of light sources with shorter wavelengths, and the use of phase-shift masks and off-axis illumination (OAI). OAI is currently the most common resolution enhancement technology, which can improve the traditional resolution by 50 percent and increase the depth of focus (DOF). However, OAI may cause the optical proximity effect (OPE).

In order to reduce the OPE, the pattern on the mask undergoes Optical Proximity Correction (OPC). However, when used for hole patterns, conventional OPC methods may have modified patterns formed on the mask with an EPE (i.e., edge placement error) exceeding a predetermined range due to mask rule restrictions.

Therefore, there is a need to solve these and other problems and to provide a method for correcting layout pattern and a mask thereof.

SUMMARY

The present disclosure provides a method for correcting layout pattern and a mask having the corrected layout pattern thereon such that both an EPE and mask rules are satisfied.

One embodiment of the present disclosure provides a method for correcting layout pattern. In the method, a first layout pattern including a first hole pattern can be provided to form an auxiliary pattern in the first hole pattern and to obtain a second layout pattern. The auxiliary pattern can have a dimension smaller than an exposure resolution in a photolithography process. The second layout pattern can then be processed by an optical proximity correction (OPC) to obtain a first modified layout pattern. The first modified layout pattern can include a modified first hole pattern by the OPC. The first modified layout pattern can be simulated to obtain an actual layout pattern such that the actual layout pattern and the first layout pattern have an edge placement error (EPE) within a predetermined range.

One embodiment of the present disclosure provides a mask after a layout pattern correction. Such mask may include a first modified layout pattern for a photolithography process. The first modified layout pattern can include a modified first hole pattern and an auxiliary pattern disposed in the modified first hole pattern. The modified first hole pattern can be obtained by processing a first hole pattern in a first layout pattern with an optical proximity correction (OPC). The auxiliary pattern can have a dimension smaller than an exposure resolution in the photolithography process such that when the first modified layout pattern is simulated to obtain an actual layout pattern, the actual layout pattern has an edge placement error (EPE) within a predetermined range with the first layout pattern.

In this manner, the method for correcting layout pattern and masks thereof can solve the problems occurred in conventional techniques that: for OPC of hole patterns, the final, modified pattern formed on the mask has an EPE exceeding the predetermined range due to mask rule restrictions. The disclosed method has the following advantages. For example, the disclosed method satisfies appropriate mask rule restrictions; provides appropriate mask bias in photolithography processes for providing sufficient depth of focus; eliminates the need for a large amount of scripts for OPC; and reduces the time for optimizing the scripts for OPC.

Other aspects or embodiments of the present disclosure can be understood by those skilled in the art in light of the description, the claims, and the drawings of the present disclosure.

DETAILED DESCRIPTION OF DISCLOSURE

Figure 1:
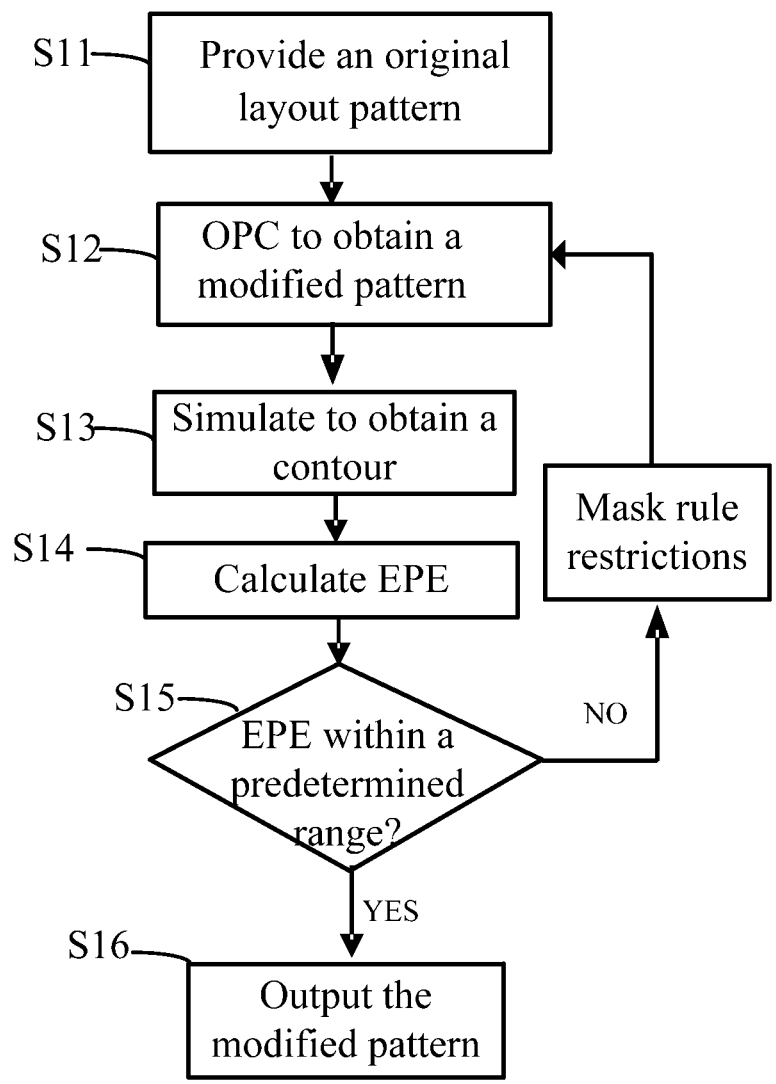
FIG. 1 is a flow chart of a conventional OPC-based method for layout pattern corrections.

Reference will now be made in detail to exemplary embodiments of the disclosure, which are illustrated in the accompanying drawings. Wherever possible, the same reference numbers will be used throughout the drawings to refer to the same or like parts. For illustration purposes, elements illustrated in the accompanying drawings are not drawn to scale, which are not intended to limit the scope of the present disclosure. In practical operations, each element in the drawings has specific dimensions such as a length, a width, and a depth.

FIG. 1 is a flow chart of a conventional OPC-based method for layout pattern correction. As shown in FIG. 1, the conventional OPC-based method for layout pattern correction includes: providing an original layout pattern (Step S11), the original layout pattern being a desired pattern to be formed on a wafer; performing OPC on the original layout pattern to obtain a modified layout pattern (Step S12); simulating the modified layout pattern to obtain an actual layout pattern (Step S13) formed on the wafer; and calculating an edge placement error (EPE) between the actual layout pattern and the original layout pattern (Step S14), and performing mask rule check (MRC) on the modified layout pattern. That is, for each OPC, an MRC is performed. MRC includes checking whether the distance between adjacent patterns and the dimensions of any pattern on the mask are larger than a predetermined value, and if so, it is determined that the mask rule is satisfied; otherwise, it is determined that the mask rule is not satisfied. The OPC-based method in the current techniques for layout pattern correction further includes: determining whether the EPE is within a predetermined range (Step S15) and a mask rule is satisfied, and if so, proceeding to step S16 to output the modified layout pattern. Otherwise if the EPE is outside of the predetermined range, the steps above are repeated to obtain a modified layout pattern that has an EPE within the predetermined range and satisfies the mask rule.

Figure 2:
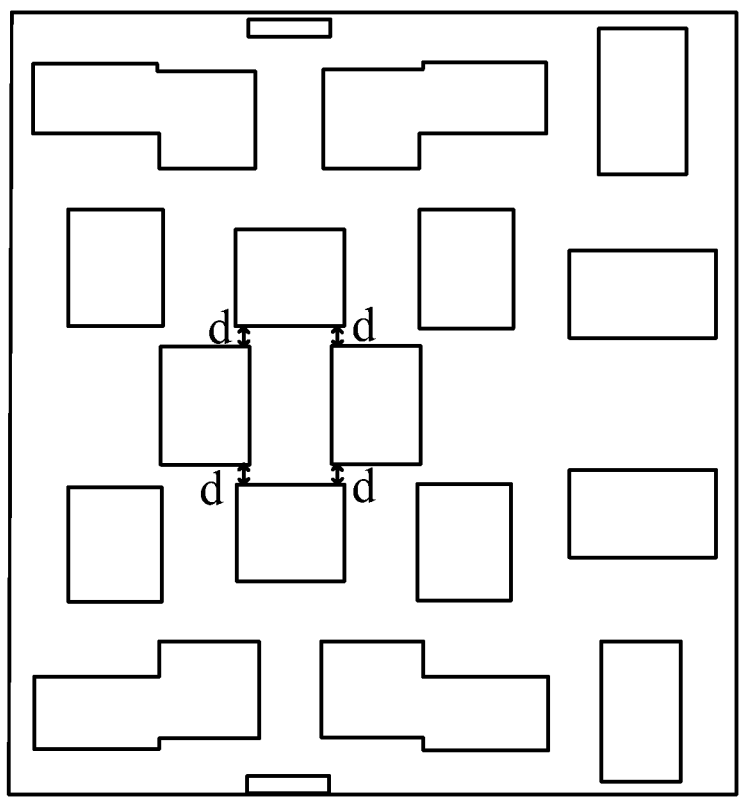
FIG. 2 illustrates a final, modified pattern satisfying a mask rule.
Figure 3:
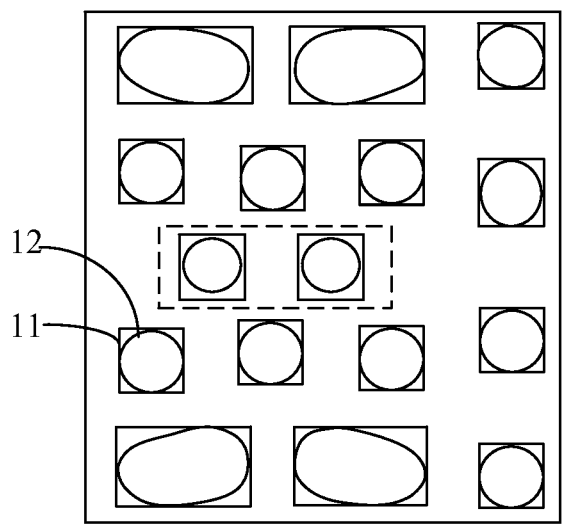
FIG. 3 illustrates an EPE between an actual layout pattern obtained by simulating the final, modified pattern in FIG. 2 and an original layout pattern.

As the feature size of semiconductor devices such as SRAMs shrinks to nanometer scale and even smaller, the degree of freedom in OPC is affected by mask rule restrictions. In this case, when the final, modified layout pattern satisfies the mask rule, the EPE between the actual layout pattern (e.g., obtained from simulating the final, modified layout pattern) and the original layout pattern is relatively large and exceeds a predetermined range. FIG. 2 illustrates a final modified layout pattern satisfying a mask rule; and FIG. 3 compares an actual layout pattern obtained from simulating the final modified layout pattern in FIG. 2 with the original layout pattern.

When the technology node is about 32 nm and below, the EPE should be less than 2 nm and the dimensions according to the mask rule should be larger than 15 nm. As shown in FIG. 3, the original layout pattern includes a plurality of hole patterns 11; and after OPC, as shown in FIG. 2, the minimum distance between the final modified patterns is 15 nm, satisfying the mask rule. However, as shown in FIG. 3, the EPE between the simulated actual layout pattern 12 and original hole pattern 11 in the dotted box is 6.5 nm, exceeding the predetermined range. Hence, if the final modified layout pattern satisfies the mask rule, the EPE exceeds the predetermined range. In another case, if the EPE is kept within the predetermined range, the final modified layout pattern does not satisfy the mask rule.

In order to solve the problems that the mask rule and the EPE cannot both be satisfied in layout pattern correction, many attempts have been made, for example, by: 1. lowering the mask rule, which may cause failure to manufacture patterns on a wafer based on the patterns on the mask; 2. improving the photolithography process to achieve a smaller mask bias in OPC, which requires a lot more efforts and cost and may affect the depth of focus; and 3. providing the edges that are likely to exceed the mask rule restrictions with fine marks and giving them special treatment, which complicates the OPC process and is design-specific, i.e., once the design of the layout pattern is changed, the marks become invalid. However, all these methods are flawed and cannot solve the problems as described above.

An exemplary method is provided herein for correcting layout pattern. In an original hole pattern, an auxiliary pattern, smaller than the photolithography resolution, can be added to provide a light intensity transfer. Corners that exceed the mask rule restrictions are then removed, which results in light intensity loss. The light intensity loss is then compensated by removing corners of the added auxiliary pattern, which thereby allows EPE within a predetermined range and allows the mask rule to be satisfied.

Figure 4:
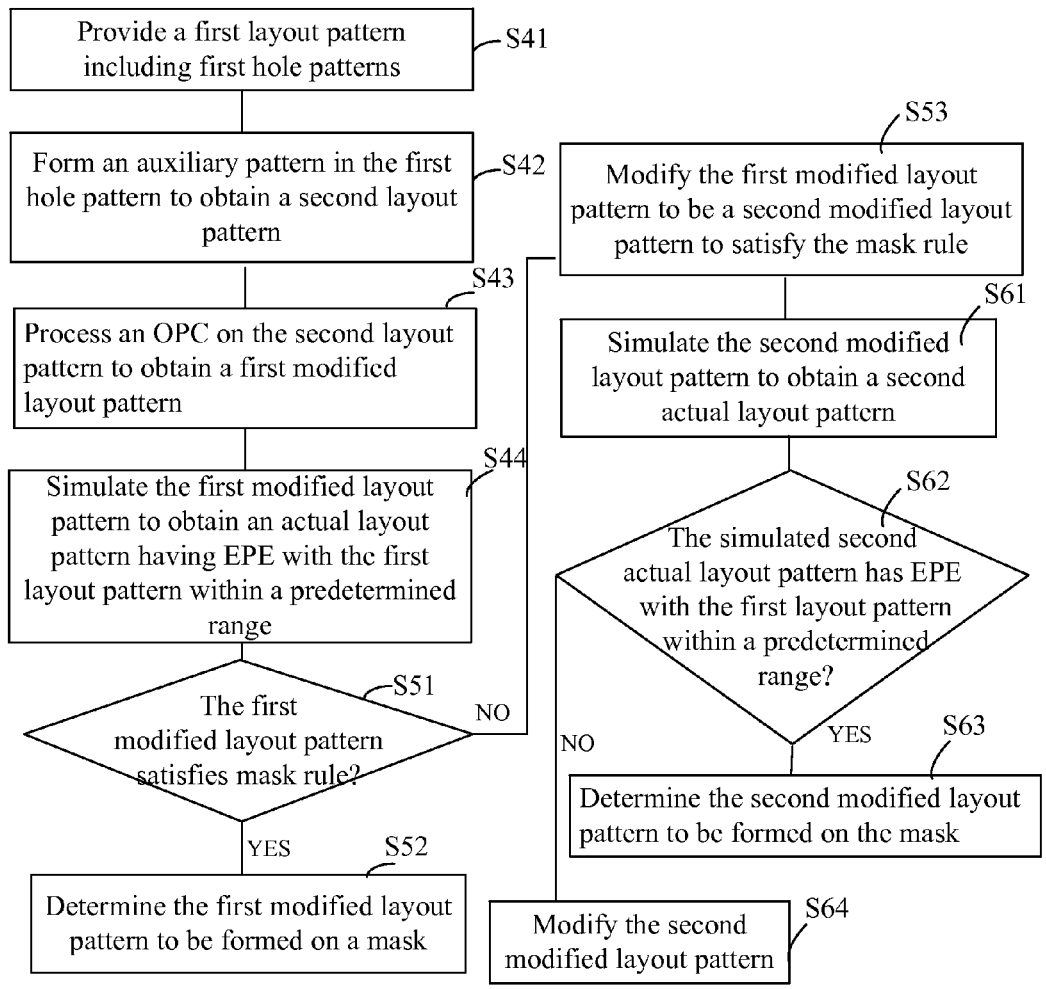
FIG. 4 is a flow chart of an exemplary method for correcting layout pattern according to an embodiment of the present disclosure.

FIG. 4 is a flow chart of a method for layout pattern correction according to an embodiment of the present disclosure. As shown in FIG. 4, the method for correcting layout pattern includes: Step S41 for providing a first layout pattern, the first layout pattern including a plurality of first hole patterns; Step S42 for forming an auxiliary pattern in the first hole pattern to obtain a second layout pattern, the dimensions of the auxiliary pattern being smaller than an exposure resolution in a photolithography process; Step S43 for performing OPC on the second layout pattern to obtain a first modified layout pattern, the first modified pattern including modified first hole patterns and (modified) auxiliary patterns; and Step S44 for simulating the first modified layout pattern to obtain an actual layout pattern, the actual layout pattern having an EPE with the first layout pattern within a predetermined range.

In an embodiment, after performing Step S44, the method further includes: Step S51 for determining whether the first modified layout pattern satisfies a mask rule. If the first modified layout pattern satisfies the mask rule, the method proceeds to Step S52, where the first modified layout pattern is determined as a modified (or final) pattern to be formed on a mask, i.e., as the final modified layout pattern. If the first modified layout pattern does not satisfy the mask rule, the method proceeds to step S53 to modify the first modified layout pattern to obtain a second modified layout pattern, the second modified layout pattern satisfying the mask rule.

In an embodiment, after performing Step S53, the method further includes Step S61 for simulating the second modified layout pattern to obtain a second actual layout pattern; Step S62 for determining whether the second actual layout pattern obtained by simulating the second modified layout pattern has an EPE with the first layout pattern within a predetermined range. If such EPE is within the predetermined range, the method then proceeds to Step S63 to determine the second modified layout pattern as the modified (or final) pattern to be formed on the mask, i.e., as the final modified layout pattern. Otherwise if such EPE is not within the predetermined range, the method then proceeds to Step S64 to modify the second modified layout pattern, and so on.

FIG. 5 to FIG. 12 show structural views illustrating a method for correcting layout pattern according to an embodiment of the present disclosure.

Figure 5:
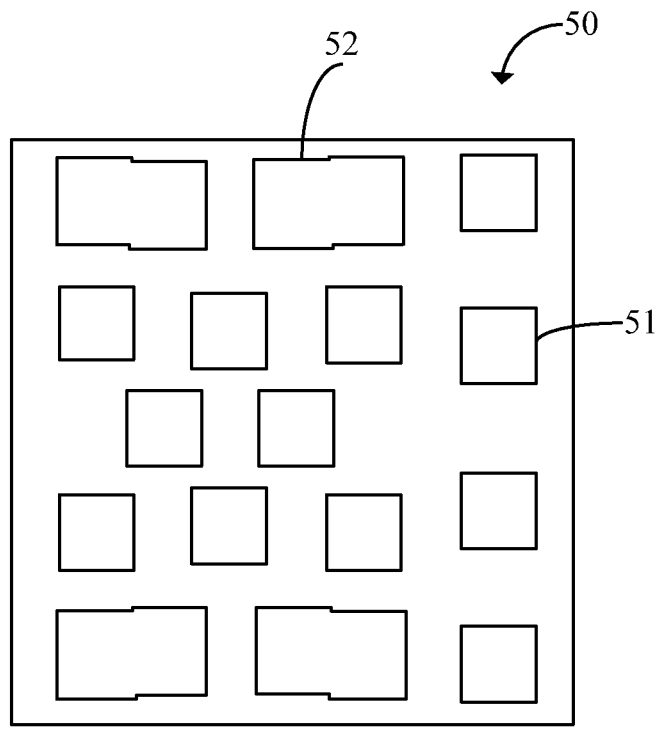
FIG. 5 to FIG. 12 show structural views illustrating an exemplary method for correcting layout pattern according to an embodiment of the present disclosure.

As shown in FIG. 5, Step S41 is performed to provide a first layout pattern 50, the first layout pattern 50 including a plurality of first hole patterns 51. As a target layout pattern, the first layout pattern 50 is designed according to an IC design plan. The first layout pattern shown in FIG. 5 is for illustrative purposes only, and should not be considered as a limitation to the first layout pattern in the present disclosure. For example, in addition to the first hole patterns 51, the first layout pattern 50 may include other patterns 52, where auxiliary patterns may (or may not) be added.

Figure 6:
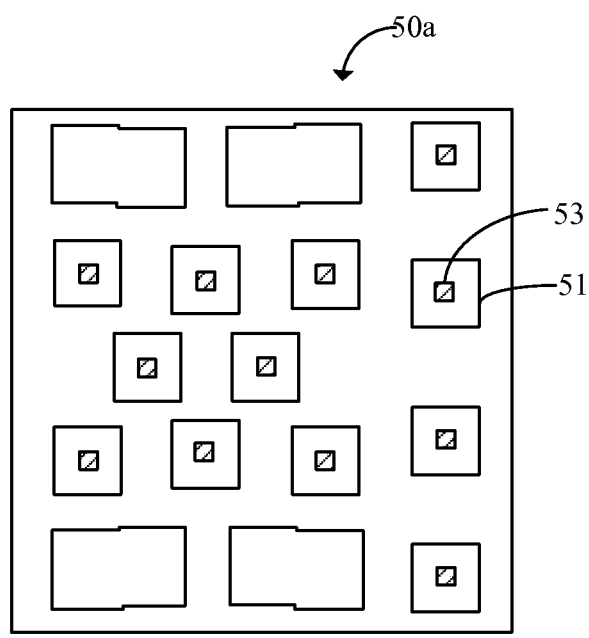

As shown in FIG. 6, Step S42 is performed to form an auxiliary pattern 53 in the first hole pattern 51 to obtain a second layout pattern 50a. The dimensions of the auxiliary pattern 53 are smaller than an exposure resolution of a photolithography tool in a photolithography process, which prevents formation of an image of auxiliary pattern 53 on a wafer without affecting the formation of an image of the first hole pattern 51. Therefore, the presence of the auxiliary pattern 53 does not affect desired modified patterns to be formed on a mask. In an embodiment, the auxiliary pattern 53 is a second hole pattern, and the second hole pattern is a square hole pattern or a rectangular hole pattern. However, the second hole pattern is not limited, any other suitable hole patterns, such as, for example, a circular hole pattern, an elliptical hole pattern, and/or a polygonal hole pattern can be encompassed according to various disclosed embodiments.

In one embodiment, when the first hole pattern 51 is a square hole pattern, the second hole pattern can be a square hole pattern or a rectangular hole pattern. In another embodiment, when the first hole pattern 51 is a rectangular hole pattern, the second hole pattern can be a square hole pattern or a rectangular hole pattern. In yet another embodiment, the first hole pattern 51 and auxiliary pattern 53 may both be square hole patterns. For example, when the first hole pattern 51 is a square hole pattern with a side length of 67 nm, the auxiliary pattern 53 can also be a square hole pattern, with a side length of 20 nm.

In an exemplary embodiment, the auxiliary pattern 53 may be formed at the center of the first hole pattern 51. However, it may also be formed at any position of the first hole pattern 51. When the auxiliary pattern 53 is formed at the center of the first hole pattern 51, the subsequent light intensity compensation may be done at the position of auxiliary pattern 53 corresponding to a light source used. Therefore, a layout pattern to be formed on a wafer by exposing the obtained modified layout pattern on a mask in the photolithography process can have a circular cross-sectional shape (e.g., corresponding to the hole patterns on the mask).

Figure 7:
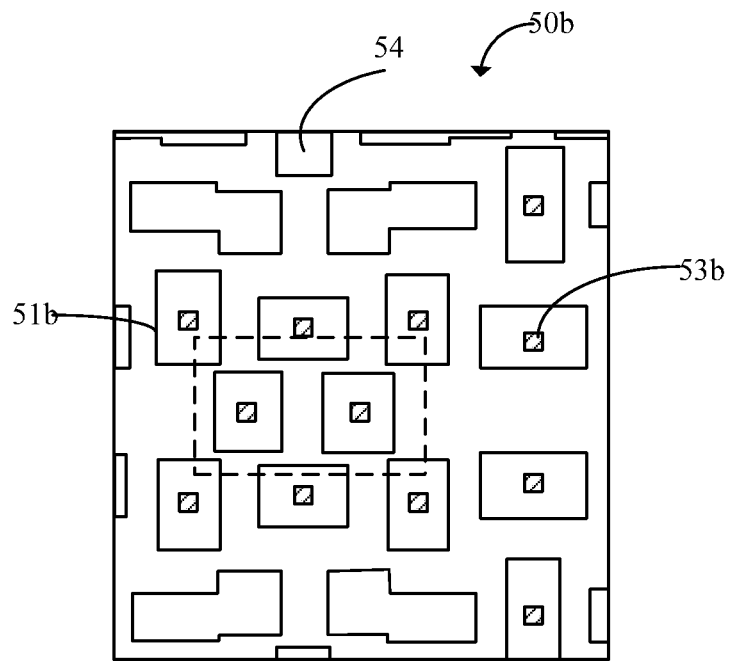
Figure 8:
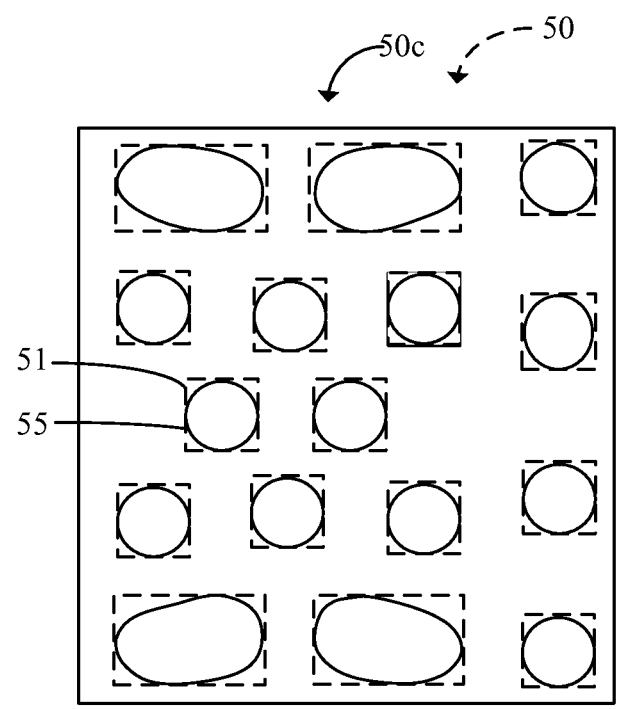

FIG. 7 illustrates a first modified layout pattern 50b; and FIG. 8 compares an actual layout pattern 50c (e.g., obtained by simulating the first modified layout pattern 50b) with the first layout pattern 50 (e.g., as shown in FIG. 5). In FIG. 8, the dotted lines denote the first layout pattern 50 while the solid lines denote the actual layout pattern 50c.

As shown in FIG. 7, Step S43 is performed to perform an OPC process to process the second layout pattern 50a to obtain a first modified layout pattern 50b. The first modified layout pattern 50b can include the modified first hole patterns 51b and modified auxiliary patterns 53b. In an embodiment, the OPC process on the second layout pattern 50a includes:

performing the OPC process on the first hole patterns 51 to form the modified first hole patterns 51b, while the OPC process is not performed to the auxiliary patterns 53, i.e., the modified auxiliary patterns 53b in FIG. 7 are maintained the same as the auxiliary patterns 53 in FIG. 6.

As shown in FIG. 8, Step S44 is performed to simulate the first modified layout pattern 50b to obtain the actual layout pattern 50c, the actual layout pattern 50c having an EPE with the first layout pattern 50 within a predetermined range. As shown in FIG. 8, the EPE between the actual layout pattern 50c (obtained from simulating the first modified layout pattern 50b) and the first layout pattern 50 is small enough to be within a predetermined range. For example, the EPE between the first hole pattern 51 and an actual pattern 55 as shown in FIG. 8 is within the predetermined range.

In an embodiment, no MRC is performed in the OPC process of the second layout pattern 50a. That is, no MRC is performed before performing OPC on the second layout pattern 50a to obtain the first modified layout pattern 50b. It is to be determined whether the first modified layout pattern 50b obtained from OPC of the second layout pattern 50a has an EPE within a predetermined layout range. But in some cases whether the first modified layout pattern 50b satisfies the mask rule is not important at this stage. This is because: whether the first modified layout pattern 50b satisfies the mask rule is determined in subsequent steps, which can reduce manufacturing time for using OPC to process the second layout pattern 50a. Because no MRC is performed during the OPC process of the second layout pattern 50a, the EPE between the actual layout pattern (obtained by simulating the modified layout pattern) and the first layout pattern can be properly in the predetermined range. After the OPC process, the first modified layout pattern 50b, which results in the actual layout pattern 50c having an EPE with the first layout pattern 50 within a predetermined range, is determined as the modified pattern to be simulated.

In an embodiment, the step of performing the OPC process on the second layout pattern 50a includes: adding a sub-resolution auxiliary pattern 54 to the second layout pattern 50a around the first hole patterns and other patterns. When the first hole pattern 51 is a square hole pattern or a rectangular hole pattern, the OPC of the second layout pattern 50a may further include: moving edges of the first hole pattern 51. Moreover, in the OPC process of the second layout pattern 50a, the auxiliary pattern 53 is fixed in position and not moved. That is, the auxiliary pattern 53 is not corrected or modified by the OPC process. In an embodiment, when the auxiliary pattern 53 is a square hole pattern or a rectangular hole pattern, the edges of auxiliary pattern 53 are fixed and not moved in the OPC of the second layout pattern 50a.

As shown in FIG. 7, after Step S44, Step S51 is performed to determine whether the first modified layout pattern 50b satisfies a mask rule. In FIG. 7, the patterns in the dotted box exceed the mask rule restrictions. In an embodiment, the determination of whether the first modified layout pattern 50b satisfies a mask rule can be implemented with any suitable methods. Generally, it is required that the distance between adjacent patterns on a mask be larger than a certain value. A closer distance there-between may cause mask manufacturing problems; and only when the distance between adjacent patterns on the mask is larger than a predetermined value according to the mask rule, the modified pattern can be manufactured using the mask. Specifically, a layout pattern having a distance larger than the predetermine value satisfies the mask rule, while a modified layout pattern having a distance smaller than the predetermined value does not satisfy the mask rule.

Figure 9:
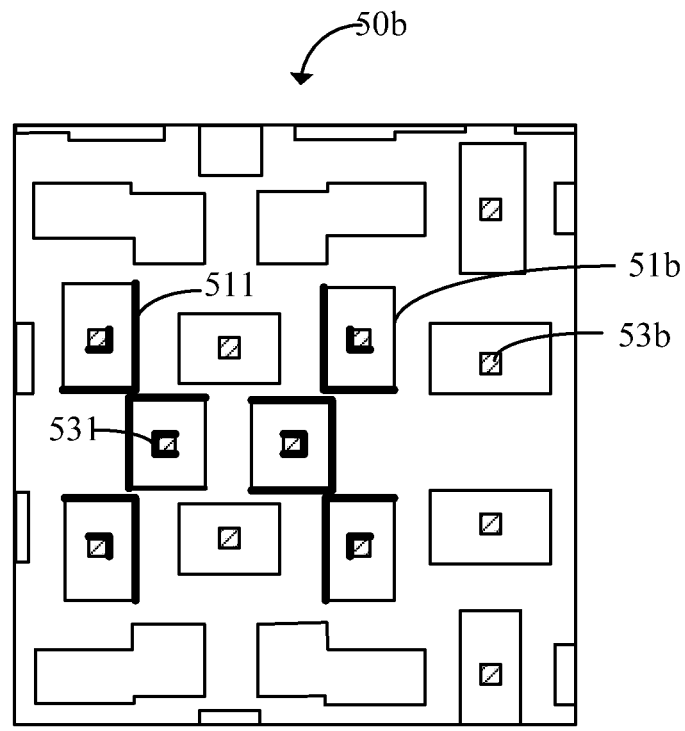
Figure 10:
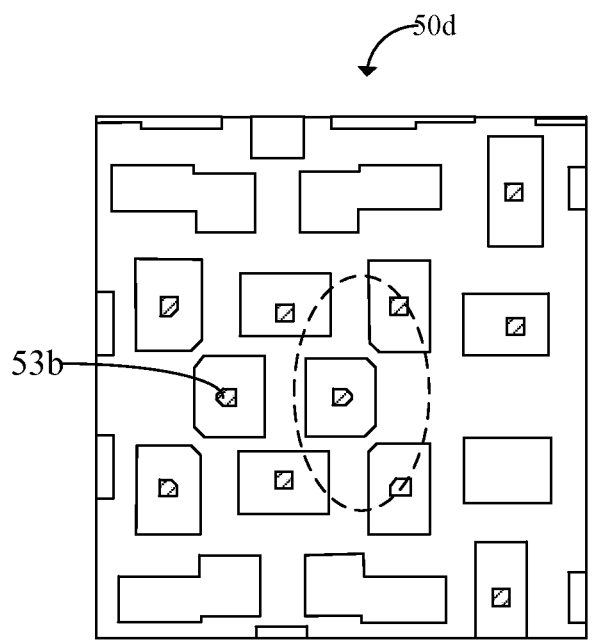
Figure 11:
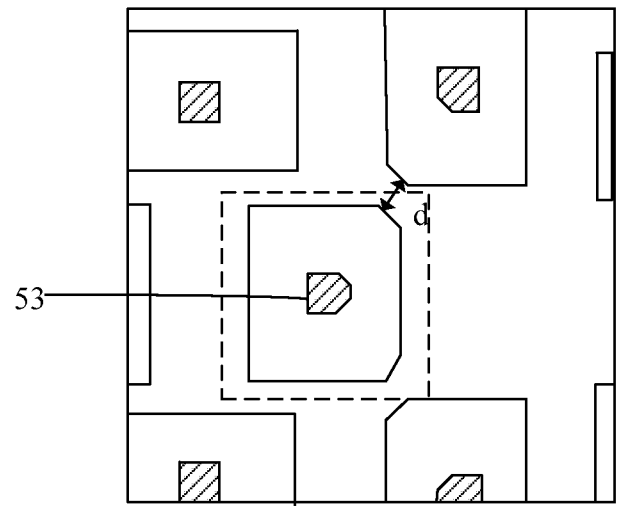

After Step S51, if the first modified layout pattern 50b satisfies the mask rule, Step S52 is performed to determine the first modified layout pattern 50b as a modified pattern to be formed on the mask. If the first modified layout pattern 50b does not satisfy the mask rule, Step S53 is then performed, as shown in FIG. 9 to FIG. 11. For example, the first modified layout pattern that does not satisfy the mask rule is modified to be a second modified layout pattern, the second modified layout pattern satisfying the mask rule. FIG. 10 illustrates the second modified layout pattern; FIG. 11 is an enlarged view of a dotted ellipse area in FIG. 10; and FIG. 12 is an enlarged view of the dotted box area in FIG. 11.

In an embodiment, modifying the first modified layout pattern that does not satisfy the mask rule includes: selecting a first edge 511 exceeding the mask rule restrictions from the modified first hole patterns of the first modified layout pattern 50b; and selecting a second edge 531 from the (modified) auxiliary patterns 53 of the first modified layout pattern 50b that is parallel and closest to the first edge 511. In FIG. 9, the first and second edges are illustrated by thick lines for illustrative purposes, to distinguish them from other edges. In other words, the first and second edges are not actually thickened during manufacturing.

In various embodiments, one second edge 531 of the auxiliary pattern 53 is parallel to a corresponding one first edge 511 of the modified first hole pattern. For example, after selecting the first edge, a second edge may be selected from the auxiliary pattern of the first modified layout pattern that is parallel and closest to the first edge from the modified first hole pattern of the first modified layout pattern.

Figure 12:
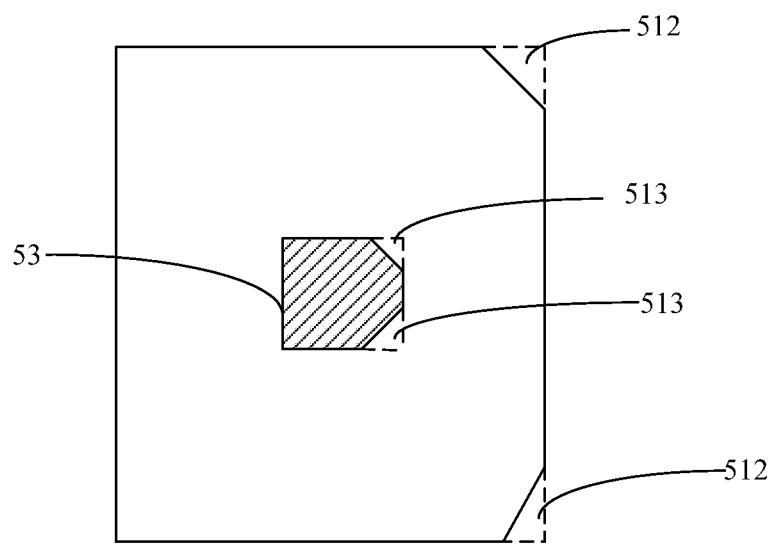

As shown in FIG. 9 and FIG. 12, a first corner 512 formed by two adjacent first edges 511 is removed, and a second corner 513 formed by two adjacent edges of the auxiliary pattern 53b is removed. As shown in FIG. 11, after the first corner 512 is removed, the pattern in the first modified layout pattern that did not satisfy the mask rule has an increased distance d between adjacent patterns, satisfying the mask rule, i.e., the second modified layout pattern 50d satisfies the mask rule.

In an embodiment, the edges that are removed with the first corner 512 may have equal lengths or different lengths, so long as the pattern that did not satisfy the mask rule can become satisfying the mask rule after the first corner 512 is removed. After the first corner is removed, the area of the first hole pattern in the modified layout pattern decreases, which may result in reduced light intensity transmitting through the mask during exposure. In order to compensate the light intensity loss in exposure due to the removal of the first corner, in an embodiment, the second corner 513 formed by second edges of the (modified) auxiliary pattern 53b is removed, thereby increasing the light transmitting area by the second corner. The dimensions of the edges that are removed with the second corner can be determined according to the removed first corner and/or other specific needs.

The second corner 513 may be formed by any two edges of the (modified) auxiliary pattern 53b. However, according to an exemplary embodiment, the second corner 513 is formed by two adjacent second edges, which ensures a light intensity compensation at a position of the (modified) auxiliary pattern 53b corresponding to a light source, so that the actual layout pattern to be formed on the wafer by exposing the modified pattern on the mask can maintain a circular cross-sectional shape. In an embodiment, after selecting the first edge 511 that exceeds the mask rule restriction from the modified first hole patterns, the method further includes marking the first edge 511. Such marking may be performed by software to memorize the first edge so that there is no need to show the mark of the first edge in the first modified pattern. In this case, the first edge 511 can be output onto some other layers to show which edge is the first edge. After selecting the second edge 531, the method may further include: marking the second edge 531. Such marking may be performed by software to memorize the second edge 531 so that there is no need to show the mark of the second edge in the first modified layout pattern. In this case, the second edge 531 can be output to some other layers to show which edge is the second edge.

Note that an exemplary second hole pattern for the (modified) auxiliary pattern 53b is not limited to a square hole pattern or rectangular hole pattern, while a circular hole pattern, an elliptical hole pattern, and/or a polygonal hole pattern may be included. The removed edges of the second corner 513 from the second hole pattern can be determined as needed to compensate the light intensity loss resulting from the removal of the first corner 512.

After obtaining the second modified layout pattern 50d as shown in FIG. 10, Step S61 is performed to simulate the second modified layout pattern 50d to obtain a second actual layout pattern. The method can then proceed to Step S62 to determine whether the second actual layout pattern obtained by simulating the second modified layout pattern 50d has an EPE with the first layout pattern 50 within a predetermined range. If the EPE is within the predetermined range, the method then proceeds to Step S63 to determine the second modified layout pattern as a modified pattern to be formed on the mask. Otherwise, if the EPE is not within the predetermined range, the method then proceeds to Step S64 to modify the second modified layout pattern.

In an embodiment, modifying the second modified layout pattern having an EPE outside of the predetermined range includes: adjusting dimensions of the first corner and dimensions of the second corner, and repeating the steps of removing the first corner and the second corner, to obtain a third modified layout pattern (not shown); simulating the third modified layout pattern to obtain a third actual layout pattern, which has an EPE with the first layout pattern within the predetermined range; and determining the third modified layout pattern as the modified pattern to be formed on the mask.

Specifically, the repeating steps of removing the first corner and the second corner includes: re-determining length portions of the edges that are removed with the first corner and the length portions of the edges that are removed with the second corner. And the number of times of the repeating steps of removing the first corner and the second corner may be determined according to specific needs, so that the actual layout pattern obtained by simulating the modified layout pattern has an EPE with the first layout pattern within a predetermined range. Then the modified layout pattern is determined to be formed on the mask.

In an embodiment, the determination of whether the EPE between the actual layout pattern (obtained by simulating any of the first, second, and/or third modified layout patterns) can be implemented using any suitable methods.

In various embodiments, after the first modified layout pattern 50b is obtained, if it can be determined that the first modified layout pattern 50b satisfies the mask rule, Steps S51 to S53 and S61 to S64 are no longer needed, and the first modified layout pattern 50b is determined as the modified pattern to be formed on the mask. However, in many cases, the first modified layout pattern 50b does not satisfy the mask rule; Steps S51 to S53 and S61 to S64 are then performed. After Step S53 where the second modified layout pattern is obtained, if it can be determined that the second modified layout pattern has an EPE with the first layout pattern within a predetermined range, then Steps S61 to S64 are no longer needed.

Various embodiments also provide the mask after the disclosed method for layout pattern correction. Such mask may include the first (or second, or third) modified layout pattern as discussed above for a photolithography process. For example, the first modified layout pattern can include a modified first hole pattern and an auxiliary pattern disposed in the modified first hole pattern. The modified first hole pattern can be obtained by processing a first hole pattern in a first layout pattern with an optical proximity correction (OPC). The auxiliary pattern can have a dimension smaller than an exposure resolution in the photolithography process such that when the first modified layout pattern is simulated to obtain an actual layout pattern, the actual layout pattern has an edge placement error (EPE) within a predetermined range with the first layout pattern.

In this manner, the method for correcting layout pattern and masks thereof can solve the problems occurred in conventional techniques that: for OPC of hole patterns, the final, modified pattern formed on the mask has an EPE exceeding the predetermined range due to mask rule restrictions. The disclosed method and mask have the following advantages. For example, the disclosed method and mask can satisfy appropriate mask rule restrictions; provide appropriate mask bias in photolithography processes for providing sufficient depth of focus; eliminate the need for a large amount of scripts for OPC; and reduce the time for optimizing the scripts for OPC.

The embodiments disclosed herein are exemplary only. Other applications, advantages, alternations, modifications, or equivalents to the disclosed embodiments are obvious to those skilled in the art and are intended to be included within the scope of the present disclosure.

What is claimed is:

1. A method for correcting a layout pattern, comprising:
providing a first layout pattern, the first layout pattern comprising a first hole pattern for forming a hole in a wafer, wherein the first hole pattern has a cross-sectional shape;
on the first layout pattern, adding an auxiliary pattern in the first hole pattern to form a second layout pattern, the auxiliary pattern having a dimension smaller than an exposure resolution in a photolithography process such that a pattern corresponding to the auxiliary pattern is not formed on the wafer, when a pattern corresponding to the first hole pattern is formed on the wafer;
processing the second layout pattern using an optical proximity correction (OPC) to process the first hole pattern to form a modified first hole pattern but not to process the auxiliary pattern in the second layout pattern to form a first modified layout pattern, the first modified layout pattern comprising the modified first hole pattern by the OPC and the auxiliary pattern non-processed by the OPC; and
simulating, using a computer, the first modified layout pattern to obtain an actual layout pattern, wherein the actual layout pattern and the first layout pattern have an edge placement error (EPE) within a predetermined range.

2. The method according to claim 1, wherein the first hole pattern is a square hole pattern or a rectangular hole pattern.

3. The method according to claim 1, wherein the auxiliary pattern is a second hole pattern.

4. The method according to claim 3, wherein the second hole pattern is a square hole pattern or a rectangular hole pattern.

5. The method according to claim 3, wherein the second hole pattern is formed at a center of the first hole pattern.

6. The method according to claim 1, wherein no mask rule check (MRC) is performed before and during the processing of the second layout pattern by the OPC to obtain the first modified layout pattern.

7. The method according to claim 1, wherein the method further comprises:
determining whether the first modified layout pattern satisfies a mask rule after simulating to have the EPE within the predetermined range, and
determining the first modified layout pattern is a modified pattern to be formed on a mask if the first modified layout pattern satisfies a mask rule, or modifying the first modified layout pattern if the first modified layout pattern does not satisfy the mask rule.

8. The method according to claim 7, wherein the modifying of the first modified layout pattern comprises:
selecting a first edge exceeding a mask rule restriction from the modified first hole pattern; and
removing a first corner formed by two adjacent first edges, and removing a second corner formed by two adjacent second edges of the auxiliary pattern to obtain a second modified layout pattern that satisfies the mask rule.

9. The method according to claim 8, wherein one second edge of the auxiliary pattern is parallel to a corresponding one first edge of the modified first hole pattern.

10. The method according to claim 9, wherein, after selecting the first edge, the method further comprises:
selecting a second edge from the auxiliary pattern of the first modified layout pattern that is parallel and closest to the first edge from the modified first hole pattern of the first modified layout pattern, and wherein the removed second corner is formed by the two adjacent second edges.

11. The method for according to claim 8, wherein the method further comprises:
simulating the second modified layout pattern to obtain a second actual layout pattern;
determining whether the second actual layout pattern has an EPE with the first layout pattern within the predetermined range, and
determining the second modified layout pattern as a modified pattern to be formed on the mask if the EPE is within the predetermined range, or modifying the second modified layout pattern if the EPE is not within the predetermined range.

12. The method according to claim 11, wherein the modifying of the second modified layout pattern comprises:
adjusting dimensions of the first corner and dimensions of the second corner, and repeating steps of removing the first corner and the second corner, to obtain a third modified layout pattern;
simulating the third modified layout pattern to obtain a third actual layout pattern having an EPE with the first layout pattern within the predetermined range; and
determining the third modified layout pattern as a modified pattern to be formed on the mask.

13. The method according to claim 1, wherein the processing by the OPC comprises moving edges of the first hole pattern.

14. The method according to claim 13, further comprising adding a sub-resolution auxiliary pattern around the first hole pattern.

15. The method according to claim 3, wherein the second hole pattern further comprises a circular hole pattern, an elliptical hole pattern, or a polygonal hole pattern.

16. A physical photolithographic mask comprising:
a first modified layout pattern for a photolithography process, the first modified layout pattern comprising a modified first hole pattern and an auxiliary pattern disposed laid out in the modified first hole pattern,
wherein the modified first hole pattern is used for forming a hole in a wafer, wherein the first hole pattern has a cross-sectional shape,
wherein the modified first hole pattern is obtained by processing a first hole pattern in a first layout pattern with an optical proximity correction (OPC) while the auxiliary pattern laid out in the first hole pattern is not OPC-processed, and
wherein the auxiliary pattern has a dimension smaller than an exposure resolution in the photolithography process such that a pattern corresponding to the auxiliary pattern is not formed on the wafer, when a pattern corresponding to the first hole pattern is formed on the wafer, and
wherein, when the first modified layout pattern is simulated to obtain an actual layout pattern, the actual layout pattern has an edge placement error (EPE) with the first layout pattern within a predetermined range.

17. The mask according to claim 16, wherein the first modified layout pattern satisfies a mask rule and the mask rule requires a distance between adjacent patterns and a dimension of any pattern on the mask to be larger than a predetermined value due to mask manufacturing restrictions.

18. The mask according to claim 16, wherein the first hole pattern is a square hole pattern or a rectangular hole pattern, and the auxiliary pattern is a second hole pattern comprising a square hole pattern or a rectangular hole pattern.

19. The mask according to claim 16, wherein the auxiliary pattern is located at a center of the first hole pattern.

20. The method according to claim 1, wherein the auxiliary pattern is added to provide a light intensity transfer, and wherein light intensity loss is generated when corners of the modified first hole pattern that exceed mask rule restrictions are removed and the light intensity loss is compensated by removing corners of the auxiliary pattern to allow EPE within the predetermined range and to meet mask rules.

* * * * *